United States Patent [19]

Brussalis et al.

[11] Patent Number: 5,715,135
[45] Date of Patent: Feb. 3, 1998

[54] ELECTRICAL DISTRIBUTION CENTER WITH TWO-PIECE INSULATION ASSEMBLY

[75] Inventors: Stacy Ann Brussalis, Niles; Aaron Dillon Monroe, Cortland; Andrew John Kocjan, Niles; Raymond John Blasko, Boardman, all of Ohio

[73] Assignee: General Motors Corporation, Detroit, Mich.

[21] Appl. No.: 689,619

[22] Filed: Aug. 12, 1996

[51] Int. Cl.$^6$ ...................... H02B 1/26
[52] U.S. Cl. .................. 361/624; 361/622; 361/730; 439/76.2
[58] Field of Search .................. 361/622, 624, 361/641–643, 646, 648, 650, 728, 730, 733, 752, 775, 822, 823, 826; 439/76.2, 65

[56] References Cited

U.S. PATENT DOCUMENTS

| | | | |
|---|---|---|---|
| 4,355,853 | 10/1982 | Kourimsky | 439/65 |
| 4,688,149 | 8/1987 | Inoue et al. | 361/752 |
| 4,689,718 | 8/1987 | Maue et al. | 361/686 |
| 5,011,417 | 4/1991 | Matsumoto et al. | 361/775 |
| 5,023,752 | 6/1991 | Detter et al. | 361/399 |
| 5,067,905 | 11/1991 | Matsumoto et al. | 439/76.2 |
| 5,207,587 | 5/1993 | Hamill et al. | 439/76 |

*Primary Examiner*—Gregory D. Thompson
*Attorney, Agent, or Firm*—Cary W. Brooks

[57] ABSTRACT

The invention includes an electrical distribution center for including a two-piece main insulation assembly. Stamped male blade or tuning fork terminals are press-fit between the two-piece main insulation assembly. The upper half of the two-piece insulation assembly has a top surface including a plurality of terminal stations and guide stations that are raised and separated from each other so as to provide a network of wire channels that communicate with wire passages. The terminal stations have terminal slots that extend through the upper half of the main insulation assembly to intersect the wire passages. The bottom surface of the lower half of the two-piece insulation assembly is configured in a similar fashion as the top base of the upper portion of the two-piece insulation assembly.

17 Claims, 6 Drawing Sheets

1

ELECTRICAL DISTRIBUTION CENTER WITH TWO-PIECE INSULATION ASSEMBLY

FIELD OF THE INVENTION

This invention relates generally to electrical distribution centers and more specifically to the portion of the electrical distribution centers that incorporate wire routed buss plates for interconnecting terminals.

BACKGROUND OF THE INVENTION

Electrical distribution centers are currently being widely used in automobiles. The electrical distribution center is simply a central junction block system designed as a stand-alone assembly. This junction block can package various fuses, relays and electronic devices in a central location. The electrical distribution centers not only reduce cost by consolidating these various functions into one block, but they also reduce the number of cut and spliced leads which helps to increase reliability. Due to the increase in electrical content in automobiles, the electrical distribution centers are becoming larger and more expensive. Prior electrical distribution centers have utilized insert molded buss layers which account for a substantial percentage of the cost of the entire electrical distribution center.

The present invention provides advantages over the prior art.

SUMMARY OF THE INVENTION

The invention includes an electrical distribution center, including a two-piece main insulation assembly. Stamped male blade or tuning fork terminals, and stamped metal bussed terminals are press-fit into the two-piece main insulation assembly. The upper half of the two-piece insulation assembly has a top surface including a plurality of terminal stations and guide stations that are raised and separated from each other so as to provide a network of wire channels that provide the communication paths for wires. The terminal stations have IDC (insulation displacement) type slots that extend through the upper half of the main insulation assembly to intersect the wire passages. The lower half of the two-piece insulation assembly is configured in a similar fashion as the upper half.

The upper and lower halves of the two-piece insulation assembly further include electrical busses including links of electrically conductive wire that pass through various IDC slots of terminals and guide stations in predetermined patterns via the network of wire channels. The electrically conductive wire is used in the upper and lower halves of the insulation assembly because it is easily routed onto the routing board surfaces and also adequate to carry a relatively low current bussing between wiring harnesses. The upper and lower halves of the two-piece insulation assembly includes a plurality of upwardly extending stakes that are received in corresponding holes formed in the other half of the two-piece insulation assembly. Each stake extend through a hole and is preferably press-fit or subsequently mushroomed-over (cold-staked) to hold the two halves of the insulation assembly together. The press-fit of the terminals in the plastic insulation assembly also helps to hold the two halves together.

These and other objects, features and advantages of the present invention will become apparent from the following brief description of the drawings, detailed description and appended claims and drawings.

DETAILED DESCRIPTION

Figure 1:
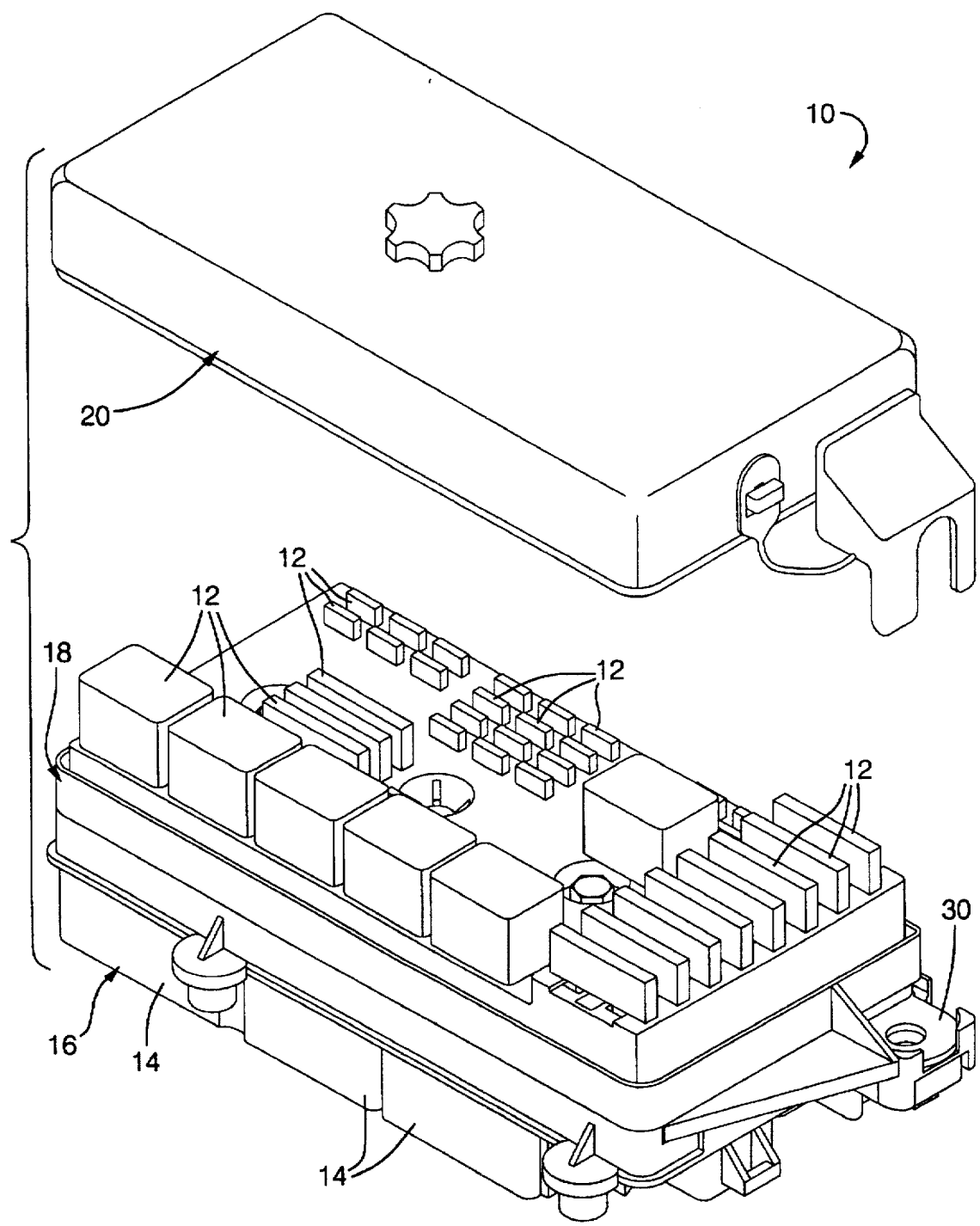
FIG. 1 is a perspective view of an electrical distribution center in accordance with the present invention with the cover shown in a raised position to illustrate the electrical and electronic components that are plugged into the electrical distribution center.
Figure 2:
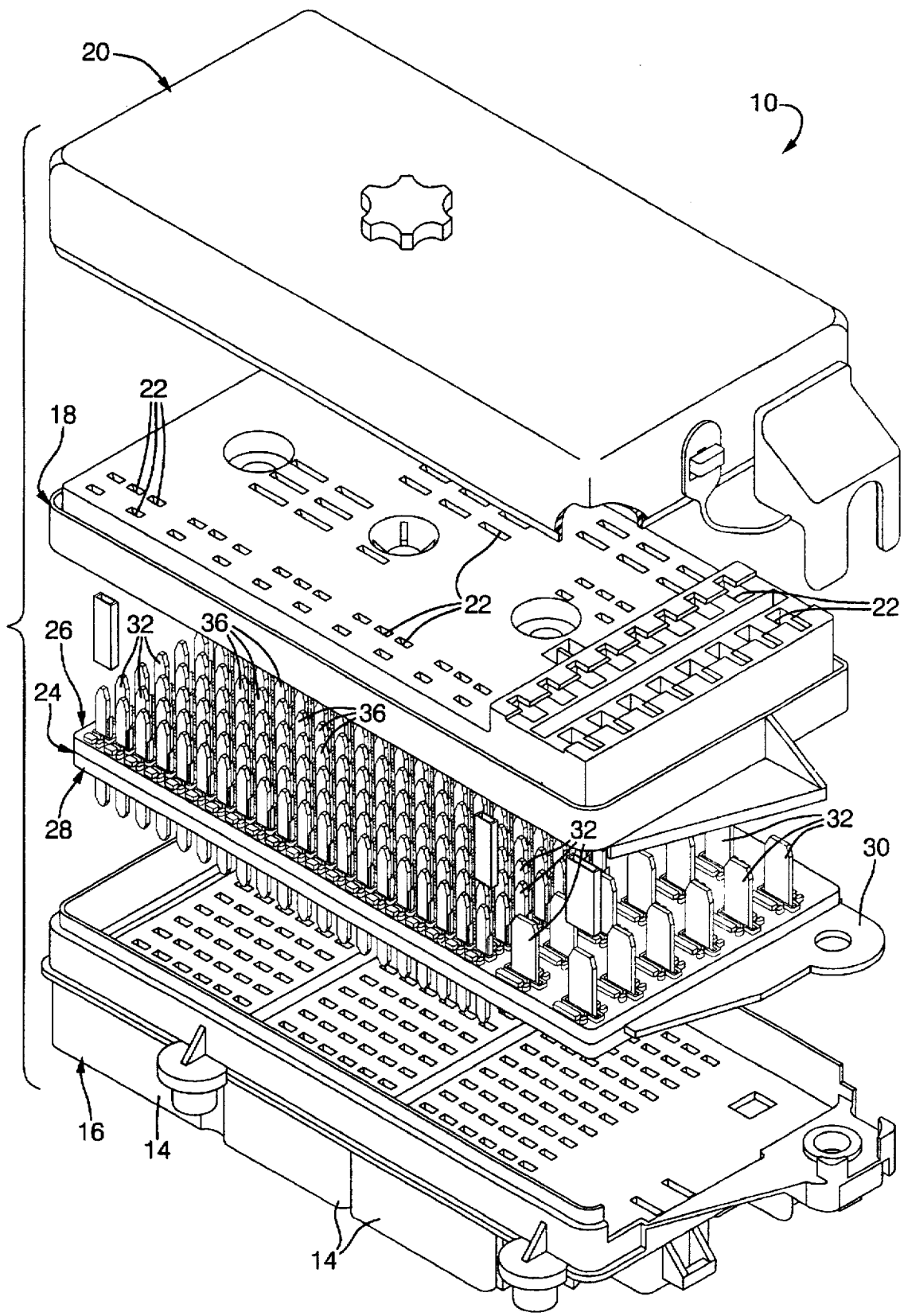
FIG. 2 is an exploded perspective view of an electrical distribution center shown in FIG. 1.
Figure 3:
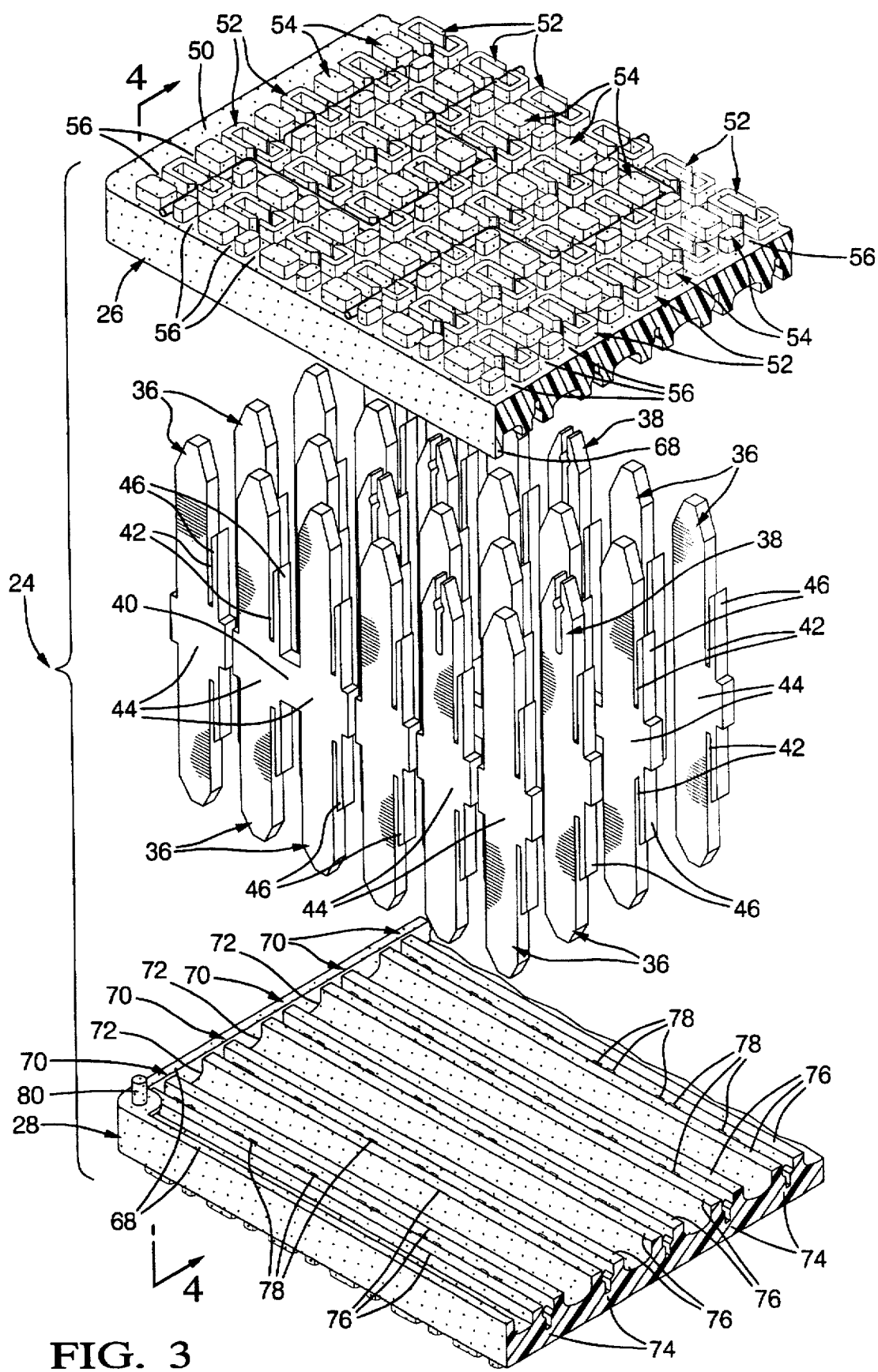
FIG. 3 is an exploded and enlarged view of a corner portion of FIG. 2.

Referring to FIG. 1 an electrical distribution center 10 provides an electrical interconnect between electrical and electronic devices 12 such as mini-fuses, maxi-fuses and relays that are plugged into the top of the electrical distribution center and the electrical connectors of wire harnesses that are plugged into a plurality of connector sockets 14 in the bottom housing 16 of the electrical distribution center 10.

The electrical distribution center typically includes the housings 16, 18 and a cover 20 that are molded from a thermal plastic electrically insulative material. The housings are comprised of a lower housing 16 and an upper housing 18 which fit together. The connector sockets 14 for receiving electrical connectors of the wire harness utilized in automotive applications can be molded as an integral part of the lower housing. Mini-fuses, maxi-fuses, devices and relays 12 can be plugged into terminal cavities 22 in the upper housing 18 and held in place by the cover 20 when the cover is attached to the housing. Such an arrangement is described in U.S. Pat. No. 5,023,752 that was granted to Gary C. Detter et al Jun. 11, 1992 for an Electrical Power Distribution Center, the disclosure of which is hereby incorporated by reference.

Figure 4:
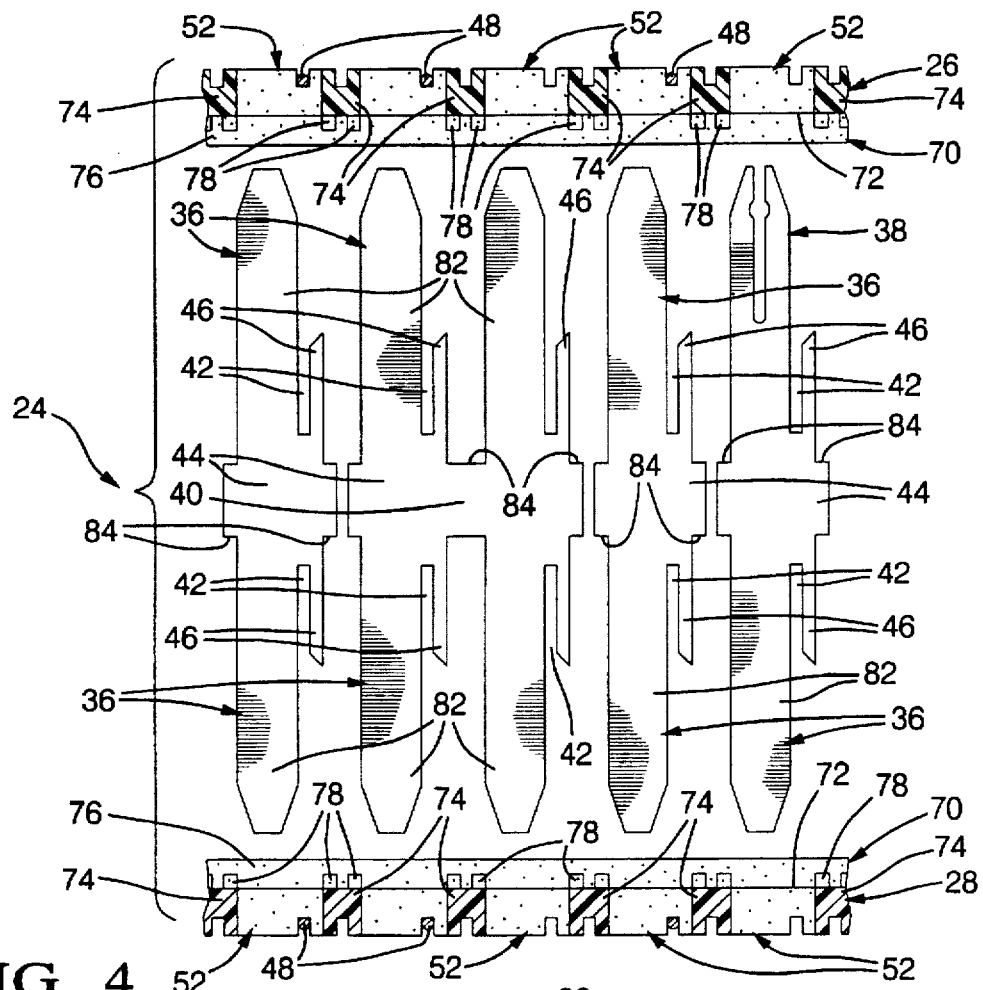
FIG. 4 is a section taken along the line 4—4 of FIG. 3 looking in a direction of the arrow.
Figure 5:
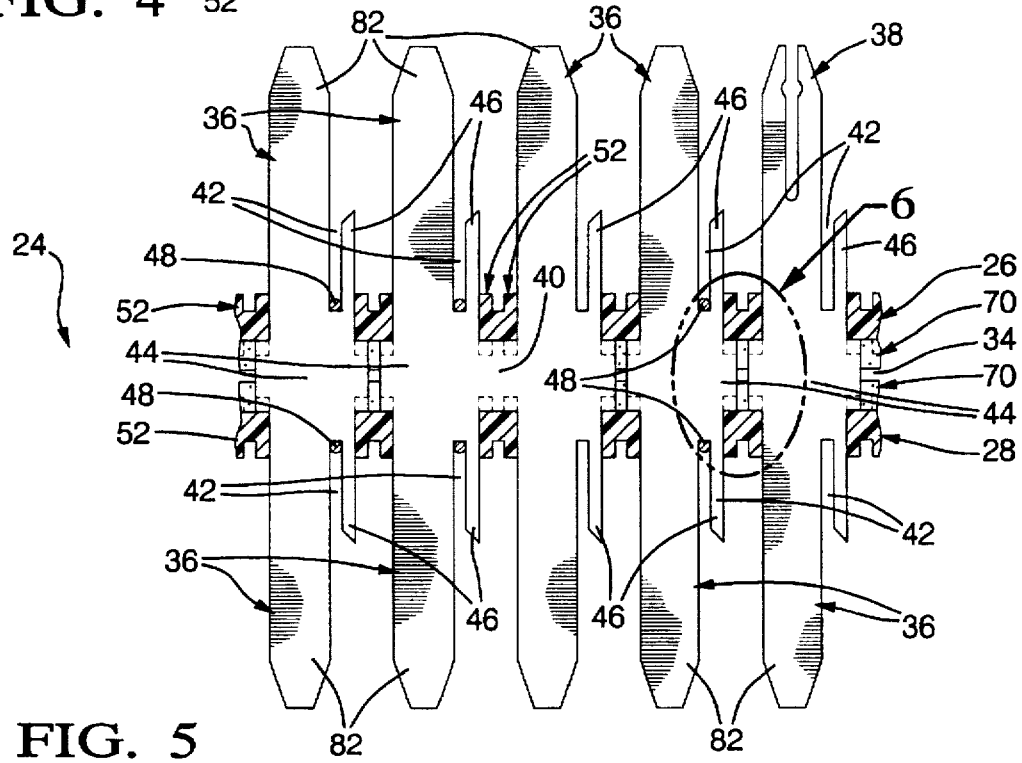
FIG. 5 is an assembled view of FIG. 4.
Figure 6:
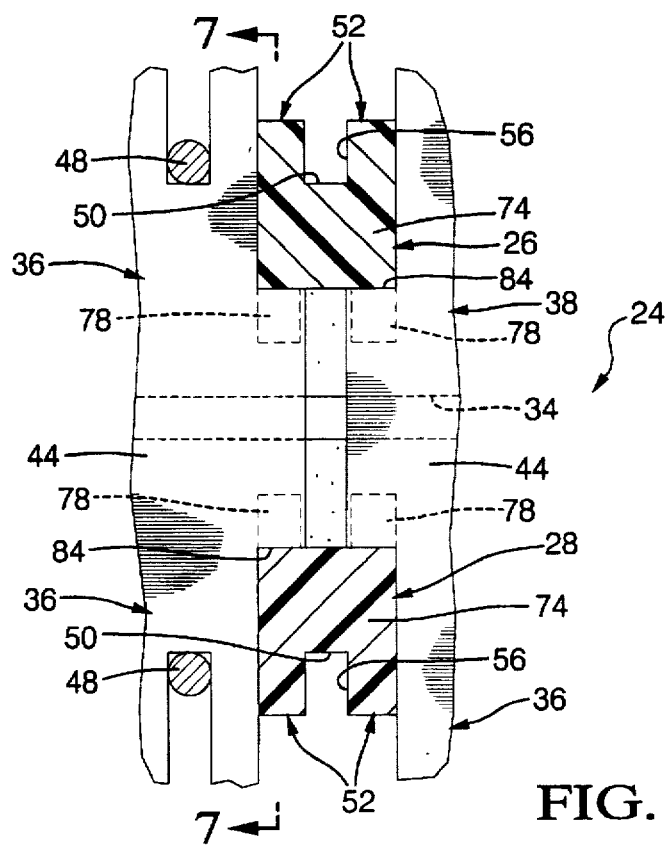
FIG. 6 is an enlargement of the area circled in FIG. 5.
Figure 7:
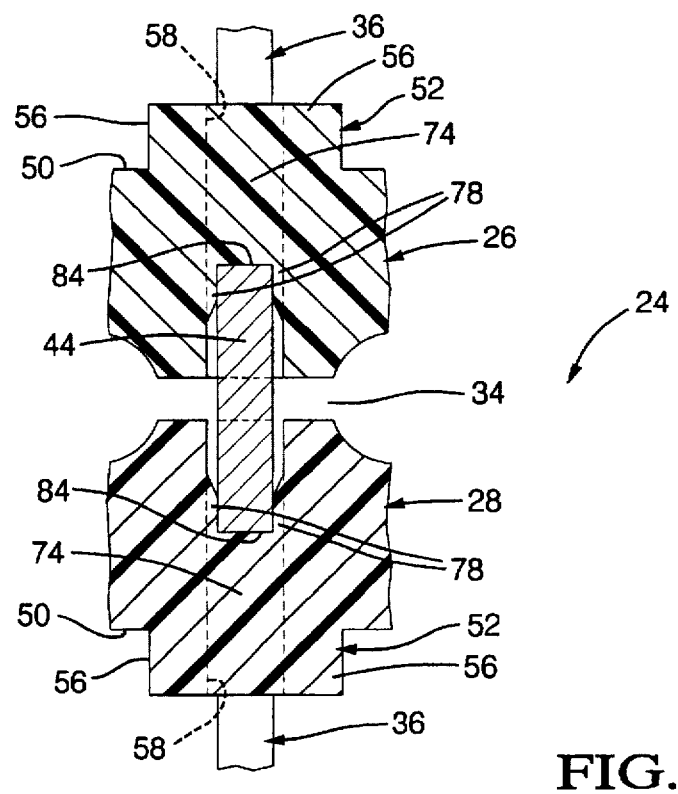
FIG. 7 is a section taken along lines 7—7 of FIG. 6.
Figure 8:
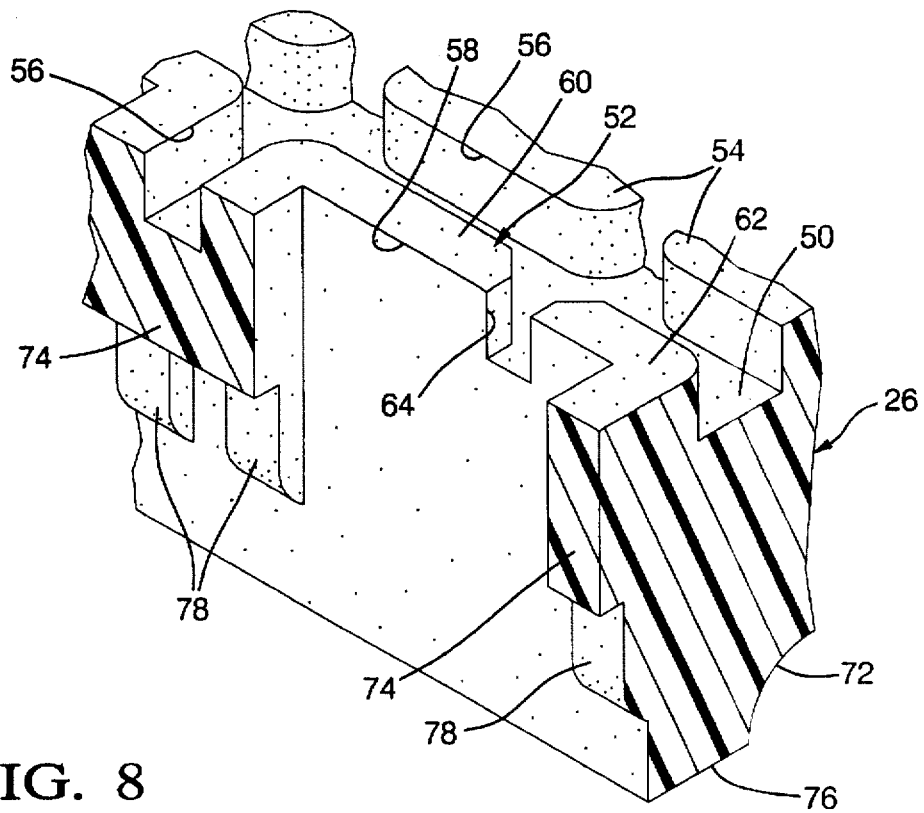
FIG. 8 is an enlarged view of the insulation plate of FIG. 4 showing engagement nubs.
Figure 9:
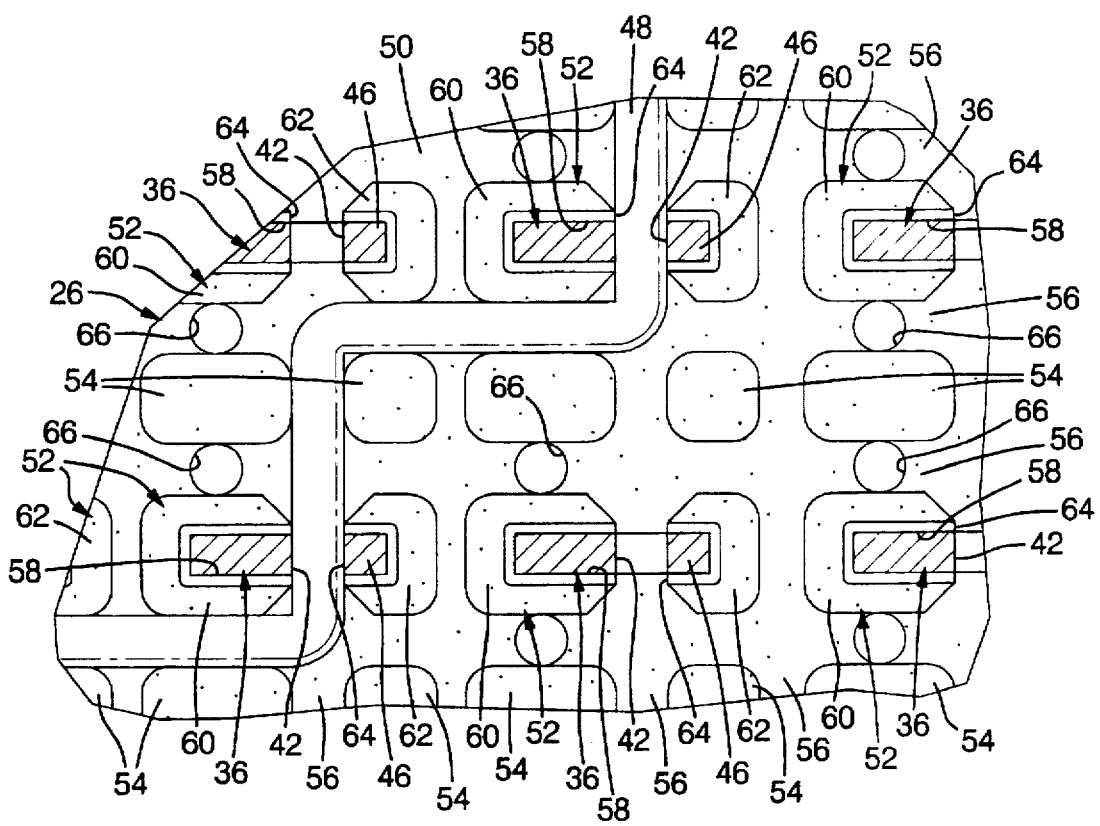
FIG. 9 is an enlarged partial view of the wire routing surface of one of the insulation plates.

The electrical distribution center includes several components that are disposed within the housing as will be appreciated from FIGS. 2–6. This includes a two-piece main insulation assembly 24 having upper 26 and lower halves 28. A main stamped metal buss plate 30 may be carried within the main insulation assembly as well as a plurality of other stamped metal circuit components 32 which are press-fit into upper and lower halves of the main insulation assembly in a predetermined pattern. A variety of different types of stamped metal circuit components 32 are usable in the current invention. In general, each of these types of stamped metal circuit components include a male blade terminal or a tuning fork terminal that protrudes outwardly from the main insulation assembly. The main stamped metal buss circuit 30 comprises a flat planar body that is carried in a gap 34 between the upper and lower insulation plate halves 26, 28 for interconnecting a plurality of terminal 32, male blade terminals 36 or tuning fork terminals 38, that are perpendicularly attached at the edge of the body (FIG. 5). These male blade or tuning fork terminals may be bent upwards to protrude through and above the upper half of the insulation assembly or bent downward to protrude through and below the lower half of the insulation assembly. Further, the male blade or tuning fork terminals may extend in the same or in opposite directions, whereby the connecting flat portion of the stamped metal circuit can include any shape (e.g., U-shaped or Z-shaped) when viewed from an end as is known to those skilled in the art and not shown in the drawings. In any event, the main buss plate comprises one or more stamped metal circuit components having male blade or tuning fork terminals arranged in a predetermined pattern and maintained in this predetermined pattern by the two-piece insulation assembly. The stamped metal circuit components have a relatively high current capacity and thus are adequate for even the highest current normally encountered in automotive wire circuits. This is especially necessary for the main stamped metal circuit component that is a power buss and includes an ear portion for connection to a battery cable and high capacity male blades or tuning fork terminals for connection to maxi-fuses.

Another general type of stamped circuit component includes a series of male blade 36 or tuning fork terminals 38 connected by a carrier strip 40 that is coplanar with male blade or tuning fork terminal. This type of stamped circuit component may vary in configuration such as a single pair of oppositely extending male blade or tuning fork terminals, or several pairs of such terminals strung together by the carrier strip Nearly all of the male blade or tuning fork terminals include a narrow wire receiving slot 42 or slots called the insulation displacement slot near the base 44 of the blade or tuning fork. This slot is defined or provided by a short finger 46 disposed of one or both sides of the blade or tuning fork as illustrated in FIG. 4. The width of the wire 48 receiving slots 42 are narrower than the conductor core of the wire it receives so that electrical contact is established when the wire is pushed into the slot in a well known manner.

Upper and lower insulation plate halves 26, 28 are provided by a routing board formed on the upper surface 50 of the upper half of two-piece insulation assembly. This upper surface includes a plurality of terminal stations 52 and a plurality of guide stations 54. The terminal and guide stations 52, 54 are raised features and are separated from each other so as to provide a network of wire channels 56 that communicate with electrical components 32 such as terminals extending through the half of the insulation assembly and that may extend through the terminal and guide stations. The terminal stations 52 have terminal slots 58 that extend through the upper half of the insulation assembly for receiving a portion of the terminals 32. Preferably the terminal station has two spaced apart raised features 60, 62 or islands. A space or path 64 is provided between the island and enters the slot so that wire may be placed through the path and into the narrow slot of the terminal as described hereafter. Further, a plurality of wire started recesses 66 may be provided on the surface into which the end of a wire is inserted and bent at a right angle to hold the wire during the wire routing process. The lower half of the two-piece insulation assembly may have a bottom surface similar configured to the top surface of the upper half of the insulation assembly.

Upper and lower buss plates include electrical busses having links of electrically conductive wire 48 that pass through various terminal and guide stations 52, 54 via the network of wire channels 56 in a predetermined pattern. Suitable buss plates and a suitable method of their manufacture are disclosed in greater detail in U.S. Pat. No. 4,684,765 granted to Lawrence R. Beck et al Aug. 4, 1987 for a Buss Assembly and Method of Making the Same, the disclosure of which is hereby incorporated by reference.

The electrically conductive wire 48 is used in the upper and lower buss plates is preferably a solid core gauge copper wire that is as easily routed onto the routing surfaces or boards and also adequate to carry the relatively low current bussing between wire harnesses, i.e., up to 15 amps continuous current. As disclosed in the Beck patent, the routing of the wire onto the routing boards is an automatic process that can be programmed quickly to create any configuration of wire routing. Thus the low current bussing circuits that are most likely to change often from automotive wiring applications are created and changed easily with minimal costs and time. Further, the current invention utilizes two similar configured upper and lower halves of the insulation assembly which are standard and allow for reconfiguration of the main buss plate by moving the male blade or tuning fork terminals to different locations within the insulation assembly as desired. This is a major advantage over the prior art insert molded main buss plate which required major tooling changes and costs associated with changes in the main buss plate design.

Now with references to FIGS. 3–8, the underside of one of the halves of the insulation assembly includes a pair of parallel side rails 68 and a plurality of beams 70 extending between the side rails. Each beam may be grooved 72 to lower material cost. A plurality of bars 74 extend between adjacent beams 70, wherein each bar has a height which is less than the height of the side walls 76 of the beam. A pair of nubs 78 are provided on the side wall of the beam at a location above the bar. The nubs 78 engage the base 44 of the terminal 36, 38 to provide press fit and terminal stability in the carrier strip region of the terminal.

A plurality of pins 80 extend outwardly from the rails 70 at selected locations to be received in and through corresponding holes formed in the other half of the insulation assembly. One or mounting holes may be formed through each half of the insulation assembly.

As shown in FIG. 4, each terminal includes a base portion 44, a male blade 82 or tuning fork extending upwardly from the base portion and a side finger 46 spaced from the male blade or tuning fork to define a narrow isolation displacement slot 42 for receiving the wire 48. A second end of the terminal may be similarly constructed. A pair of stop ledges or wings 84 extend outwardly from opposite sides of the base portion. As shown in FIG. 4, multiple terminals such as two-way, three-way, four-way, etc., may be provided wherein a carrier strip 40 connecting the terminals together acts as a positive stop 84 against the bar 74 of the beam.

As the terminal is inserted through the slot of the insulation plate, the nubs 78 engage the front and back face of the base portion 44 of the terminal for a frictional, or press-fit, and the outwardly extending stop ledge 84 engage and stop on the bar 74. The nubs 78 are just one concept to achieve the terminal stability via press fitting metal in plastic. When all of the terminals have been stitched into the lower half 28 of the insulation assembly, the upper plate 26 is slid over the terminals 36, 38 so that the extending pins 80 of each half of the insulation assembly are received in corresponding holes formed in the other half of the insulation assembly. These pins 80 may be frictionally fitted into the holes formed in other half of the insulation assembly or pressure may be applied to the end of the pin to cold flow the plastic pin so that the pin is crushed and a lock is formed.

Additional routed wire buss plates may be added on top of the above-described configuration to provide fourth, fifth buss plates and so forth in the manner described herein or as described in U.S. Pat. No. 5,207,587 issued Hamill et al May 4, 1993 entitled "Electrical Distribution Center", the disclosure of which is hereby incorporated by reference.

Other modifications within the spirit and scope of the invention are also possible. In other words, we wish to be understood that we do not desire to be limited to the exact details of construction shown and described for obvious modifications will occur to those skilled in the art.

What is claimed is:

1. An electrical distribution center for providing electrical interconnections between electrical and electronic devices and electrical connectors of wire harnesses comprising:

a buss plate assembly including an insulation assembly having a first and second half, each half including a pair of spaced-apart side rails and a plurality of beams extending between the side rails, and a plurality of bars extending between adjacent beams, each beam having opposed side walls and wherein said bars have a height less than said beam side walls, and said beams and said bars define slots for receiving a stamped metal terminal;

said stamped metal terminal having a body portion with an upwardly extending prong for making electrical contact with an electric component, and wherein said body portion defines a pair of opposed outwardly extending stop ledges;

wherein said body portion of said terminal is frictionally engaged by adjacent beams and said outwardly extending ledges stop on a bar; and wherein said second half of said insulation assembly overlies said first half and said first and second half are secured together.

2. An electrical distribution center as set forth in claim 1 wherein said first half of said insulation assembly includes a plurality of pins extending outwardly from selective beams and said second half of said insulation assembly having holes formed therein each of said holes for receiving a respective pin.

3. An electrical distribution center as set in claim 2 wherein each of said pins is frictionally received in one of said holes.

4. An electrical distribution center as set in claim 2 wherein each of said extends through one of said holes and the top of each of said pins is crushed outwardly to lock said first and second half together.

5. An electrical distribution center as set forth in claim 1 wherein each of said side walls of said beams have a chamfered portion to provide clearance for inserting said terminal in said terminal slots.

6. An electrical distribution center as set forth in claim 1 wherein each of said side walls of said beams have at least one outwardly extending hub associated with each slot for frictionally engaging said terminal.

7. An electrical distribution center as set forth in claim 1 wherein said side walls include two nubs overlying said bar.

8. An electrical distribution center as set forth in claim 1 further comprising multiple terminals including two or more terminals bussed together by a carrier strip.

9. An electrical distribution center as set forth in claim 1 wherein one of said prongs of said terminals comprises a male blade.

10. An electrical distribution center as set forth in claim 1 wherein the prong of one of said terminals comprises a tuning fork constructed and arranged to frictionally receive a male blade of an electrical device.

11. An electronic distribution center as set forth in claim 1 wherein at least one of said terminals further comprises a finger spaced apart from said prong and extending upwardly from said body portion and wherein said prong and said finger define a narrow slot for receiving a wire.

12. An electrical distribution center as set forth in claim 1 wherein said first half of said insulation assembly includes an upper surface defining a wire routing surface having raised features spaced from each other and constructed and arranged to provide a network of wire channels.

13. An electrical distribution center as set forth in claim 12 further comprising an electrical buss including links of electrically conductive wire received in selective wire channels and connected to a plurality of said terminals.

14. An electrical distribution center as set forth in claim 14 wherein one of said electrical terminals includes a finger upwardly extending from the body portion and spaced apart from said prong to define a narrow slot into which said electrically conductive wire is received.

15. An electrical distribution center as set forth in claim 1 wherein said second half of said insulation assembly has a bottom surface including a plurality of raised features spaced apart from each other so as to provide a network of wire channel.

16. An electrical distribution center as set forth in claim 1 further comprising a female-female coupling secured to said prong of said terminal and a male blade of an electrical device secured to the other end of the female-female coupling.

17. An electronic distribution center as set forth in claim 10 further comprising a electronic device having a male terminal blade extending therefrom and frictionally engaging said tuning fork.

* * * * *